US008045251B2

(12) United States Patent
Muenter et al.

(10) Patent No.: US 8,045,251 B2
(45) Date of Patent: Oct. 25, 2011

(54) COHERENCE LENGTH CONTROLLER

(75) Inventors: Steven Edward Muenter, Van Nuys, CA (US); Todd Harding Tomkinson, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 713 days.

(21) Appl. No.: 11/951,399

(22) Filed: Dec. 6, 2007

(65) Prior Publication Data

US 2009/0147341 A1    Jun. 11, 2009

(51) Int. Cl.
*G02B 26/00* (2006.01)
*A61B 3/00* (2006.01)
*G01B 9/02* (2006.01)
*G02F 1/01* (2006.01)

(52) U.S. Cl. ........ 359/238; 351/200; 351/246; 356/450; 359/279

(58) Field of Classification Search .................. 359/315, 359/215, 247, 251–252, 254, 108, 237–238, 359/278–279, 290–292, 298, 300–302; 351/246; 385/1–3, 40, 129–132, 5, 8–9; 356/450, 356/479, 497
See application file for complete search history.

(56) References Cited

U.S. PATENT DOCUMENTS

| 5,136,599 A | 8/1992 | Wilcox |
| 5,825,791 A | 10/1998 | Injeyan et al. |
| 7,061,622 B2 * | 6/2006 | Rollins et al. ................. 356/497 |
| 2001/0036002 A1 * | 11/2001 | Tearney et al. ............... 359/287 |
| 2002/0141714 A1 * | 10/2002 | Reed et al. ..................... 385/116 |

* cited by examiner

*Primary Examiner* — Dawayne A Pinkney
(74) *Attorney, Agent, or Firm* — Hope Baldauff Hartman LLC

(57) ABSTRACT

Techniques for producing higher fidelity interferometer measurements by reducing sensitivity to spurious sources include reducing the coherence length of an electromagnetic beam. In addition, multiple surfaces within an optical system may be measured by electronically tuning the position of a coherence plane along the optical paths of an interferometer. A phase modulator is used in conjunction with a long coherence length electromagnetic source to generate beams for each leg of an interferometer. Providing a controlled broadband RF signal to the phase modulator increases the bandwidth of the beam and thereby reduces the coherence length of the beam. This reduces the spurious contributions to the output interference fringes from undesired surfaces along the beam path.

18 Claims, 4 Drawing Sheets

COHERENCE LENGTH CONTROLLER

TECHNICAL FIELD

This application relates generally to reducing the coherence length of electromagnetic beams, and more specifically to removing spurious interference fringes at the output of an interferometer system by reducing the coherence length of an electromagnetic source used within the interferometer.

BACKGROUND

Coherence is a property of waves, such as those in the electromagnetic spectrum, in which light is a subset. The property of coherence enables two waves to exhibit interference. When waves interfere, parts of the waves may add constructively or subtract destructively. Coherence, or the degree of coherence, is a parameter that quantifies the ability of the two waves to interfere with each another. The property of coherence is used in various applications such as interferometry, positioning, optical testing, holography, optical strain sensors, radio antenna arrays, optical tomography, telescope interferometers, radio astronomy and many other optical and radio frequency (RF) applications.

In addition to coherence relating to the ability of two waves to interfere, coherence may also relate to one wave's ability to interfere with itself. More specifically, the degree of coherence of a wave can imply how much a wave is like a copy of itself shifted slightly in time or space. For example, any wave is perfectly identical to a copy of itself that is not shifted. However, shifting the copy of the wave a small amount might cause the copy to appear nothing like the original wave. Such a wave has a lower degree of coherence than a wave that can be shifted by a larger amount and still be similar to itself. So the higher the degree of coherence, the more self-similar the wave is. In other words, the wave has a higher autocorrelation, since it correlates more strongly with itself.

Electromagnetic waves, such as light or RF waves, have a constant speed of propagation represented by the symbol "c" which is approximately 300,000,000 meters per second in vacuum. Since the speed is constant, an electromagnetic wave can be counted on to move a specific distance when a specific amount of time passes. Also, a specific amount of time passes when an electromagnetic wave moves a specific distance. As such, shifting, or moving, an electromagnetic wave can be described as a change in time or a change in distance. These descriptions (temporal and spatial) can generally be used interchangeably as the speed of propagation "c" can be used to convert between the time and the distance.

Any wave will correlate perfectly to a copy of itself that is not shifted. A slightly coherent wave will also correlate somewhat with a slightly shifted copy of itself, but will likely not correlate at all with a copy of itself that is shifted a large amount. In contrast, a perfectly coherent wave will correlate perfectly with a copy of itself that is shifted by any amount. A wave that can be transversely shifted a large amount and remain correlated to itself is said to have high spatial coherence, whereas a wave that can be longitudinally shifted a large amount and remain correlated to itself is said to have high temporal coherence. Temporal coherence can be quantified by the coherence length or the coherence time, which is the coherence length divided by "c".

The spectral content of a signal, or a wave, can be considered from a "frequency domain" point of view. Such a frequency domain view can be obtained by performing the Fourier transform of the time-domain representation of the signal. The bandwidth of the signal is the span of frequencies over which its spectral content is non-zero. For example, lasers generally have a very narrow bandwidth. A theoretically perfect laser might have only one frequency component, and thus an infinitesimally small bandwidth. The frequency domain view of the signal from such a perfect laser would appear as a single line at the frequency of the laser. This line can be represented mathematically by the delta function. Accordingly, such a source of electromagnetic energy can be referred to as a line source. In contrast, white light is composed of a broad range of frequencies that are visible to the human eye. That is, white light has many frequency components, and thus a wide bandwidth. A source of white light, far from being a line source, is instead a broadband, or wideband, source.

Since a laser can emit a (very nearly) single frequency of radiation, the light is monochromatic, or generally always the same, or highly self-similar. Thus, laser light can be very coherent. In other words, laser light can have a very long coherence length. For example, a frequency stabilized helium-neon (HeNe) laser can produce light with coherence lengths of several kilometers. In contrast, white light is made up of many different frequencies. With such great diversity of spectral content, a wave from a white light source may not be very similar if examined at different times or places along the wave. That is, the wave is not highly self-similar, not very coherent, and may have an extremely short coherence length. With such a short coherence length, the white light wave will only interfere with a copy of itself that is very minimally shifted in time or space.

Interferometry is a technique where interference between two or more waves creates an interference pattern that can be analyzed to determine differences between the waves. Interferometry is often used for measuring small path length differences such as would occur from small distance or refractive-index differences. One or more interference patterns are typically processed to extract phase maps or other useful data. Interferometers often use two waves having the same frequency. This can be accomplished by splitting a single source into two, in which case each of the splits might be called a leg or branch of the interferometer. Where the two waves are in phase, they will interfere constructively (add to each other), while where they are out of phase, they will interfere destructively (cancel each other out). Thus the constructive or destructive interferences shown within the interference pattern can indicate differences in the path lengths between the arms of the interferometer. There are many types of interferometers all of which employ the same basic principles. Some examples include the Michelson interferometer, the Twyman-Green interferometer, the Mach-Zehnder interferometer, the Sagnac interferometer, and the Fabry-Perot interferometer.

It is often desirable for the interference pattern of interest to have the highest contrast possible. This occurs when regions of destructive interference produce nearly complete cancellation of the waves, and regions of constructive interference have the greatest wave amplitude. In the past, this has typically meant that the path length difference between the two paths of interest would have to be much smaller than the coherence length of the source. So, for example, if a white-light source is used, its extremely short coherence length necessitates that the interferometer's two path lengths would have to be almost exactly the same.

In an interferometer setup there are generally many surfaces within the system off of which the waves may reflect or scatter creating wave paths in addition to those of the main interfering legs. Although these are not the main interfering wave paths, they can still introduce extraneous interference patterns if their path length differences are shorter than the source's coherence length. These extraneous patterns can mix with the desired interference pattern, making the resulting pattern more difficult to process, thereby reducing the effectiveness of the interferometer. Various techniques may be used to attempt to mitigate the occurrence of these extraneous fringe patterns, including the use of: wedged optics, antireflection coatings, field stops, software processing, phase shifting, polarization adjustment, and other methods. These techniques may be difficult to employ, expensive, and/or have limited efficacy.

It is with respect to these considerations and others that the disclosure made herein is presented.

SUMMARY

Technologies are described herein for controlling the coherence length of an electromagnetic beam to remove spurious interference fringes at the output of an interferometer system. Through the utilization of the technologies and concepts presented herein, the coherence length of an electromagnetic beam can be controlled by applying a modulating signal to a phase modulator and applying the phase modulator to the electromagnetic beam. By adjusting the bandwidth of the modulating signal provided to the phase modulator, the coherence length of the electromagnetic beam can adjustably reduced. Moreover, technology presented herein supports introducing a phase delay into an electromagnetic beam for positioning the region of measurement within an interferometer system.

According to various embodiments presented herein, a system for controlling the coherence length of a coherent radiation beam includes a signal generator, a variable control, and a phase modulator. The signal generator is used to produce a broadband signal that is provided to the phase modulator. The bandwidth of the broadband signal is controlled using the variable control. The phase modulator modifies the frequency spectrum of the coherent radiation beam in response to the bandwidth adjustment of the broadband signal. By controlling the bandwidth of the signal, the coherence length of the coherent radiation beam can be controlled.

According to other embodiments, a method for controlling the coherence length of a coherent radiation beam is provided. A coherent radiation source is provided to generate the coherent radiation beam. The coherent radiation beam is then provided to a phase modulator. The phase modulator is used to modulate the coherent radiation beam using the broadband signal to reduce the coherence length of the coherent radiation beam.

According to further embodiments, a method is provided for controlling the coherence length of a coherent radiation beam within an interferometer system. A coherent radiation source is used to generate the coherent radiation beam. A reference beam and a measurement beam are derived from the coherent radiation beam. The measurement beam is applied to a sample. An output pattern is generated in response to an interference between the reference beam and the measurement beam after the measurement beam is applied to the sample. A phase modulator is applied to both the reference beam and the measurement beam, and a broadband signal is provided to each of the phase modulators. The broadband signal is then controlled in order to improve the contrast of the output pattern.

The features, functions, and advantages that have been discussed can be achieved independently in various embodiments of the present invention or may be combined in yet other embodiments, further details of which can be seen with reference to the following description and drawings.

DETAILED DESCRIPTION

The following detailed description is directed to technologies for controlling the coherence length of an electromagnetic beam. As stated above, embodiments presented herein allow for the control of the coherence length of an electromagnetic beam through the application of a modulating signal to a phase modulator, and applying the phase modulator to the electromagnetic beam. Furthermore, a phase delay may be introduced into the electromagnetic beam to provide adjustable positioning of the coherence plane within an interferometer system.

According to various embodiments described below, phase modulators are used to modify electromagnetic beams used in each leg of an interferometer. Even though the path lengths between the various desired and spurious paths of an interferometer may be different for each permutation of path pairs, all pairs whose path-length differences are shorter than the coherence length of the source may yield spurious fringe patterns. However, by reducing the coherence length, such as applying a phase modulation to a beam from the source according to the embodiments discussed below, the contrast, and hence the visibility of the spurious interference patterns may be substantially reduced by only allowing interference to occur in the region where the path lengths are equal, or very nearly equal. Adjusting the coherence length by modifying the electrical modulating signal can reduce the interfering region (also known as the coherence region) to include only the desired measurement planes. Note that the center of this coherence region can be referred to as "the plane of coherence"

Additionally, the disclosure provided herein allows for the reduced region of measurement to be intentionally shifted, or positioned along the beam paths of the interferometer system. The modulation of the beams can be electronically advanced or retarded to allow positioning the region of measurement within the interferometer so as to increase the fringe contrast from a desired source while substantially reducing the fringe contrast from all other sources. This may be accomplished by introducing a time delay into one or both of the phase modulating signals within the interferometer as needed. Thus, phase modulation can reduce the depth of the coherence plane within the interferometer where high contrast interference may occur, while the introduction of phase delay can position the coherence plane as desired.

While the subject matter described herein may be presented in the general context of optical systems, laser beams, lenses, and mirrors, one skilled in the art will recognize that other implementations may be performed in combination with other types of electromagnetic waves and beams. Furthermore, one skilled in the art will recognize that any techniques for modulating the electromagnetic beams and thus spreading the bandwidth of the beams utilizing the disclosure provided below may be used.

Figure 1:
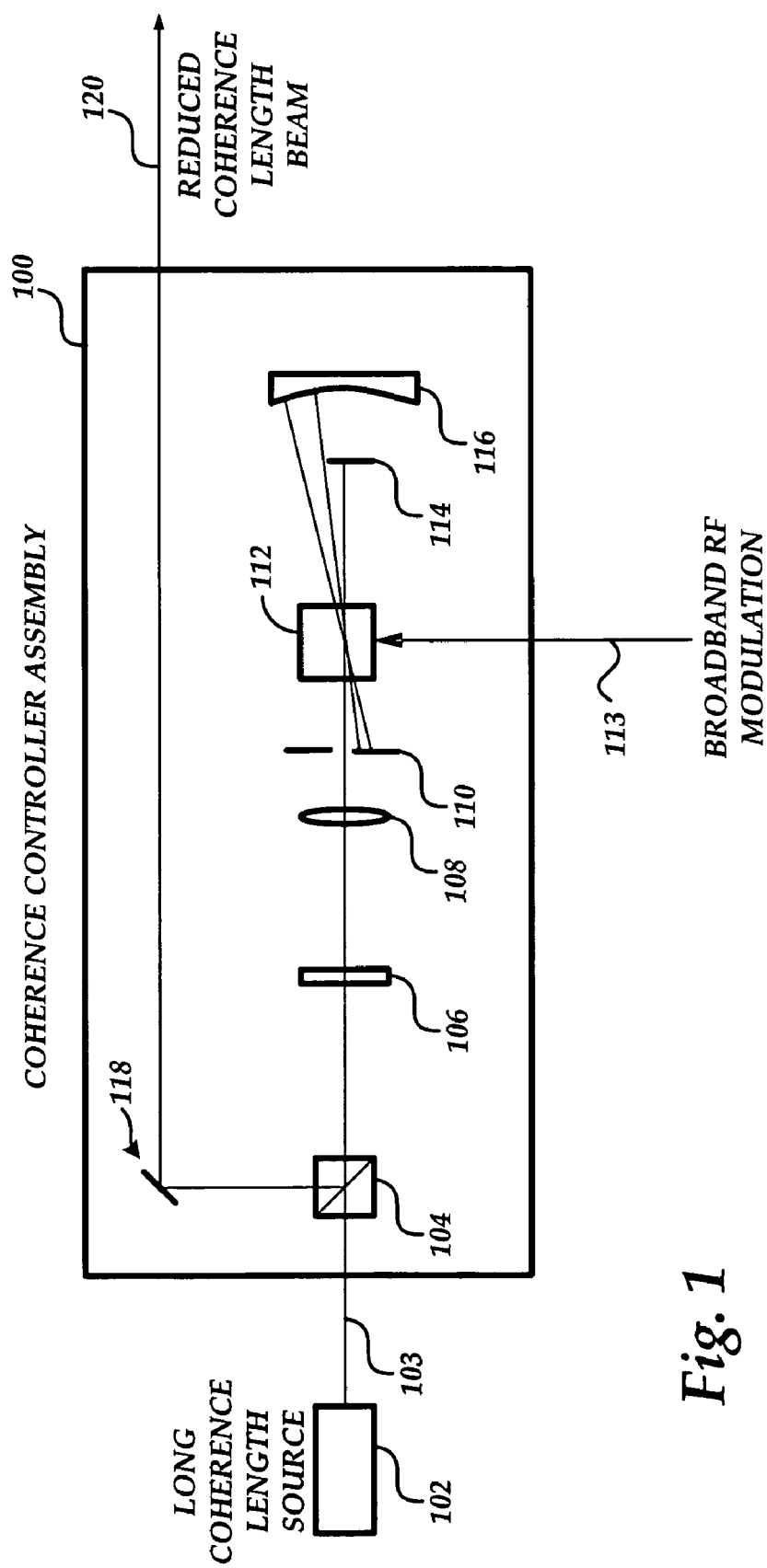
FIG. 1 is an optical system diagram illustrating a coherence controller system according to embodiments described herein.

In the following detailed description, references are made to the accompanying drawings that form a part hereof, and which are shown by way of illustration specific embodiments or examples. Referring now to the drawings, in which like numerals represent like elements through the several figures, aspects of a coherence length controller will be described. Turning first to FIG. 1, details will be provided regarding an illustrative optical system for controlling beam coherence. In particular, FIG. 1 is an optical system diagram illustrating a coherence controller assembly 100 according to various embodiments. A long coherence length source 102 emits an electromagnetic, long coherence length beam 103. For example, a frequency stabilized polarized laser may be used to emit a laser light beam. The long coherence length beam 103 can be processed by a coherence controller assembly 100 to provide a reduced coherence length beam 120.

Polarizing beam splitters are often used to split a beam according to two separate polarizations. According to the embodiment illustrated by FIG. 1, the polarizing beam splitter 104 allows long coherence length beam 103 to pass through while reflecting the return beam as described below. The long coherence length beam 103 proceeds through the beam splitter 104 to a quarter-wavelength waveplate 106. The quarter-wavelength waveplate 106 converts the beam to a circular polarization. The polarization of an electromagnetic wave can describe the direction of the transverse electric field of the wave. The circularly polarized beam proceeds from the quarter-wavelength waveplate 106 to a lens 108, which focuses the beam into a phase modulator 112.

The phase modulator 112 can be an acousto-optic modulator (AOM, also known as a Bragg cell), an electro-optic modulator, a magneto-optic modulator, or any other type of phase modulator. The example of the phase modulator embodied in FIG. 1 is an AOM. Within the phase modulator 112, a broadband RF signal 113 interacts with the electromagnetic beam. This interaction can both diffract (deviate) and frequency modulate (broaden) the electromagnetic beam. The portion of the beam that proceeds straight through the phase modulator 112 is not deflected. This non-deflected portion of the beam can be blocked by a beam stop 114. The diffracted beams can be retro-reflected from a spherical mirror 116 back into the phase modulator 112. After being retro-reflected back into the phase modulator 112, the beams can again interact with the RF modulation. This second interaction within the phase modulator 112 can once again frequency modulate the beams and diffract the beams back along their original path. Considering both passes through the phase modulator 112, the bandwidth of the electromagnetic beam can be broadened by twice the bandwidth of the broadband RF signal 113. Thus, control of the broadband RF signal 113, such as by a digital controller, can also control the final bandwidth of the electromagnetic beam being modulated. Spreading the bandwidth of the electromagnetic beam can reduce the coherence length of the electromagnetic beam. For example, broadening a narrow bandwidth laser source out to about 1 GHz of bandwidth can provide a coherence length of about one third of a meter (about one foot).

After being retro-reflected from the spherical mirror 116, the beams are diffracted back along their original path by the phase modulator 112. Any beams that are not diffracted back along the original path can be blocked by an iris 110. The beam that is diffracted back along the original path is collimated by the lens 108. After being collimated by the lens 108, the beam is converted from circular polarization to linear polarization by the quarter-wavelength waveplate 106. The linear polarization provided to this reverse path through the quarter-wavelength waveplate 106 may be orthogonal to the original polarization of the long coherence length beam 103. Due to the orthogonal polarity of the return path beam, the polarizing beam splitter 104 reflects the return beam. This reflected beam proceeds to a mirror 118 to direct the output beam of the coherence controller assembly 100. This reduced coherence length beam 120 can have a reduced coherence length that is determined by the broadband RF signal 113.

Figure 2:
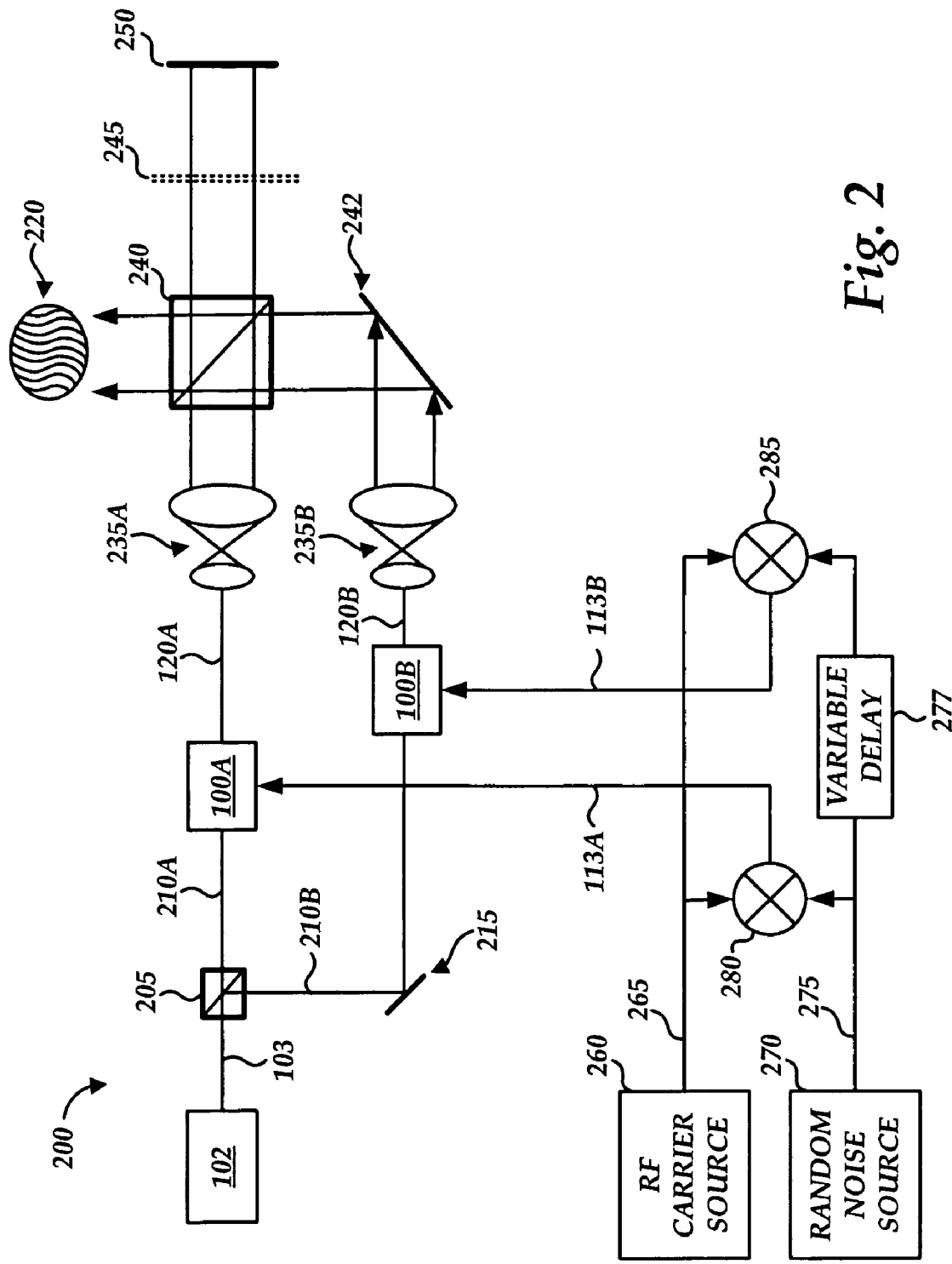
FIG. 2 is an optical system diagram illustrating an interferometer system using two modulated coherence controllers according to embodiments described herein.

Referring now to FIG. 2, additional details will be provided regarding the embodiments presented herein for interferometry using a coherence controller 100. In particular, FIG. 2 is an optical system diagram illustrating an interferometer system 200 using two modulated coherence controller assemblies 100A-100B according to one exemplary embodiment.

The long coherence length beam 103 output from a long coherence length source 102 (such as a laser) can be split into two beams to form each leg of an interferometer 200. A beam splitter 205 can be used to split the long coherence length beam 103 emitted from the long coherence length source 102. A first beam 210A from the beam splitter 205 passes through a first coherence controller assembly 100A. A second beam 210B from the beam splitter 205 can reflect off of a mirror 215 and pass through a second coherence controller assembly 100B.

After passing through the first coherence controller assembly 100A, the first beam 210A emerges as a first reduced coherence length beam 120A. This first reduced coherence length beam 120A can be reshaped (for example expanded) by a lens assembly 235A. After being reshaped, the first reduced coherence length beam 120A passes through a beam splitter 240 to interact with a sample 245. After interacting with the sample 245, the beam 120A can reflect off of a mirror 250 and reflect off of the beam splitter 240 to an output plane. The output plane is where the output interference fringes 220 can be displayed, scanned, or captured. The sample 245 is generally the object to be measured with the interferometer. Because the first reduced coherence length beam 120A can interact with the sample 245, it may be called the measurement beam or the measurement leg of the interferometer 200.

After passing through the second coherence controller assembly 100B, the second beam 210B emerges as a second reduced coherence length beam 120B. This second reduced coherence length beam 120B can be reshaped (for example expanded) by a lens assembly 235B. After being reshaped, the second reduced coherence length beam 120B reflects off a mirror 242 and passes through a beam splitter 240 to an output plane. The output plane is where the output interference fringes 220 can be displayed, scanned, or captured. Because the second reduced coherence length beam 120B generally does not interact with the sample 245, it may be called the reference beam or the reference leg of the interferometer 200. The reference beam and the measurement beam can finally interfere with one another at the output plane to generate interference fringes 220.

The first coherence controller assembly 100A modulates the first beam 210A to generate the first reduced coherence length beam 120A. The modulation is controlled by a first broadband RF modulating signal 113A, which is generated by an RF mixer 280. The RF mixer 280 mixes an RF carrier signal 265 with an RF noise signal 275. The RF carrier signal 265 is generated by an RF carrier source 260, may be an oscillator, crystal oscillator, function generator, radio frequency oscillator, optical oscillator, or any other source for generating an RF carrier. The RF noise signal 275 is generated by a random noise source 270, which may be a pseudorandom source.

The second coherence controller assembly 100B modulates the second beam 210B to generate the second reduced coherence length beam 120B. The modulation is controlled by a second broadband RF modulating signal 113B generated by an RF mixer 285. Similar to the RF mixer 280 described above, the RF mixer 285 mixes the RF carrier signal 265 with an RF noise signal 275. If desired, prior to entering the RF mixer 285, the RF noise signal 275 may be delayed in time by passing through a variable delay device 277, which will be described in greater detail below.

As discussed above, the RF modulating signals 113A, 113B can be derived from the RF carrier signal 265 that is broadened in bandwidth by mixing with the RF noise signal 275. The frequency spectrum of the RF noise signal 275, which may be a random or pseudorandom noise signal, can extend from zero frequency (DC) to a controllable upper frequency. The optical frequency spectrum, or bandwidth, of a long coherence length beam 103 from a long coherence length source 102 (such as a laser) can be broadened as this controllable upper frequency of the random noise source 270 is increased. Broadening the optical frequency, or bandwidth, of the beam from the long coherence length source 102 can decrease the coherence length of the beam. Representative spectral plots of the RF signals 265, 275, 113A, 113B are addressed in more detail with respect to FIG. 3.

The interferometer 200 can be set up so that the path length of the measurement beam as it interacts with the sample 245 is approximately equal to the path length of the reference beam. Such a set up may allow the interference fringes that relate to the interactions from the sample 245 to appear with the highest contrast at the output plane 220. Without the use of coherence length control assemblies 100A and 100B to reduce the coherence lengths, the reference beam and the measurement beam may have a long enough coherence length to allow, not only the desired interference related to the sample 245, but also various other interferences caused by beams reflecting and interacting with many other surfaces within the interferometer 200. These other interference can form unwanted, extraneous interference fringes at the output plane 220 in addition to the desired interference fringes from the interaction with the sample 245.

However, by reducing the coherence length of the beams, these extra paths may lie outside of the coherence length of the beam and thus will generate interference fringes with sufficiently low contrast as to be negligibly visible. For example, the interference length may be reduced to limit the coherence plane to only the area immediately around the sample 245 where the reference beam and the measurement beam are of nearly equal path lengths. In this case, an extra reflection off of another surface may generate a measurement beam path and a reference beam path having different path lengths such that the difference in the path lengths exceeds the (now reduced) coherence length of the beams and thus may not form the unwanted interference fringes that mix with the desired interference fringes 220 at the output plane.

The interferometer 200 may be configured so that the length of the measurement beam as it interacts with the sample 245 is not exactly equal to the length of the reference beam. This may be remedied using the variable delay device 277. The variable delay device 277 is used to delay or advance the phase of the second broadband RF modulating signal 113B. This effectively increases or decreases the path length of the reference beam of the interferometer 200. This adjustment can be made using an electronic control associated with the variable delay device 277. Using the variable delay device 277 to effectively increase or decrease the path length of the reference beam of the interferometer 200 allows positioning of the coherence plane at various locations within the interferometer 200, which in turn allows the examination of reflections or interactions from various positions along the beam path within the interferometer 200.

Figure 3A:
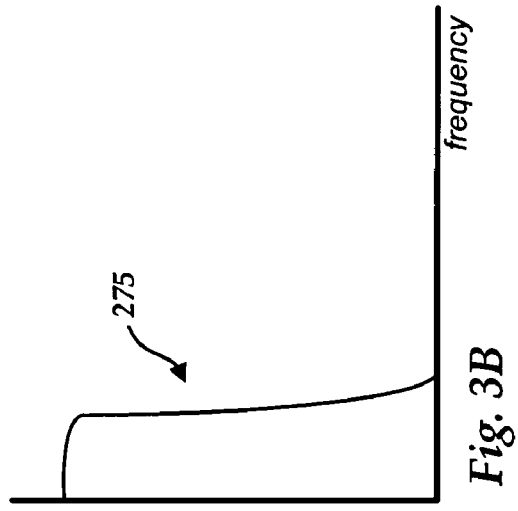
FIGS. 3A-3C are frequency domain graphs illustrating the spectral content of signals used within a coherence control system according to embodiments described herein.
Figure 3B:
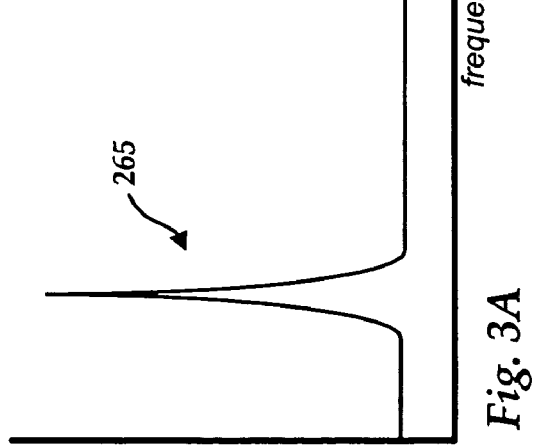
Figure 3C:
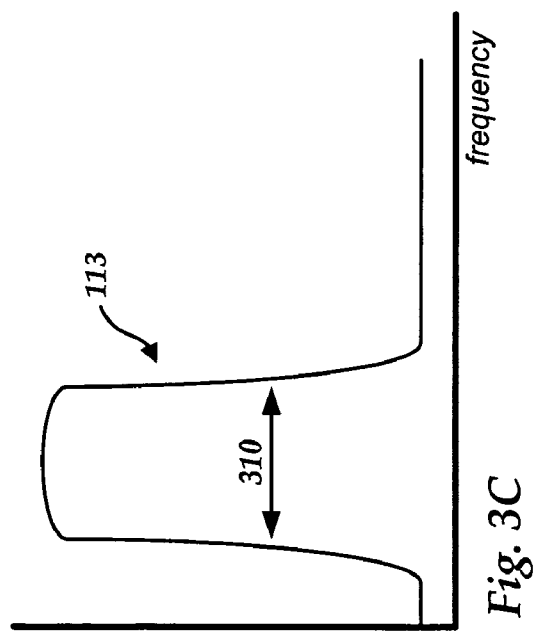

Turning now to FIGS. 3A-3C, additional details will be provided regarding the embodiments presented herein for coherence length control. In particular, FIG. 3A is a frequency domain graph illustrating the spectral content of the RF carrier signal 265 generated by the RF carrier source 260. FIG. 3B is a frequency domain graph illustrating the spectral content of the RF noise signal 275 generated by the random noise source 270. FIG. 3C is a frequency domain graph illustrating the spectral content of the broadband RF modulating signal 113.

As discussed above and further illustrated now in FIGS. 3A-3C, the broadband RF modulating signal 113 is formed by mixing the RF noise signal 275 with the RF carrier signal 265 at the RF mixers 280 and 285. The spectrum of the random noise signal 275 can be flat (white noise, or band limited white noise), Gaussian, or of any other random distribution and extending from zero frequency (DC) to a controllable upper frequency. Increasing the controllable upper frequency broadens the random noise signal 275. The broadband RF modulating signal 113 includes the random noise signal 275 positioned as an upper sideband at the carrier frequency and a reflected copy of the random noise signal 275 positioned as a lower sideband. As such, broadening the random noise signal 275 by a fixed amount can increase the bandwidth 310 of the broadband RF modulating signal 113 by twice that fixed amount. As discussed above, increasing the bandwidth 310 of broadband RF modulating signal 113 can operate through the coherence controller assembly 100 to reduce the coherence length of the long coherence length beam 103 to form the reduced coherence length beam 120. Since the bandwidth 310 is controllable, the coherence length of the reduced coherence length beam 120 is also controllable.

Figure 4:
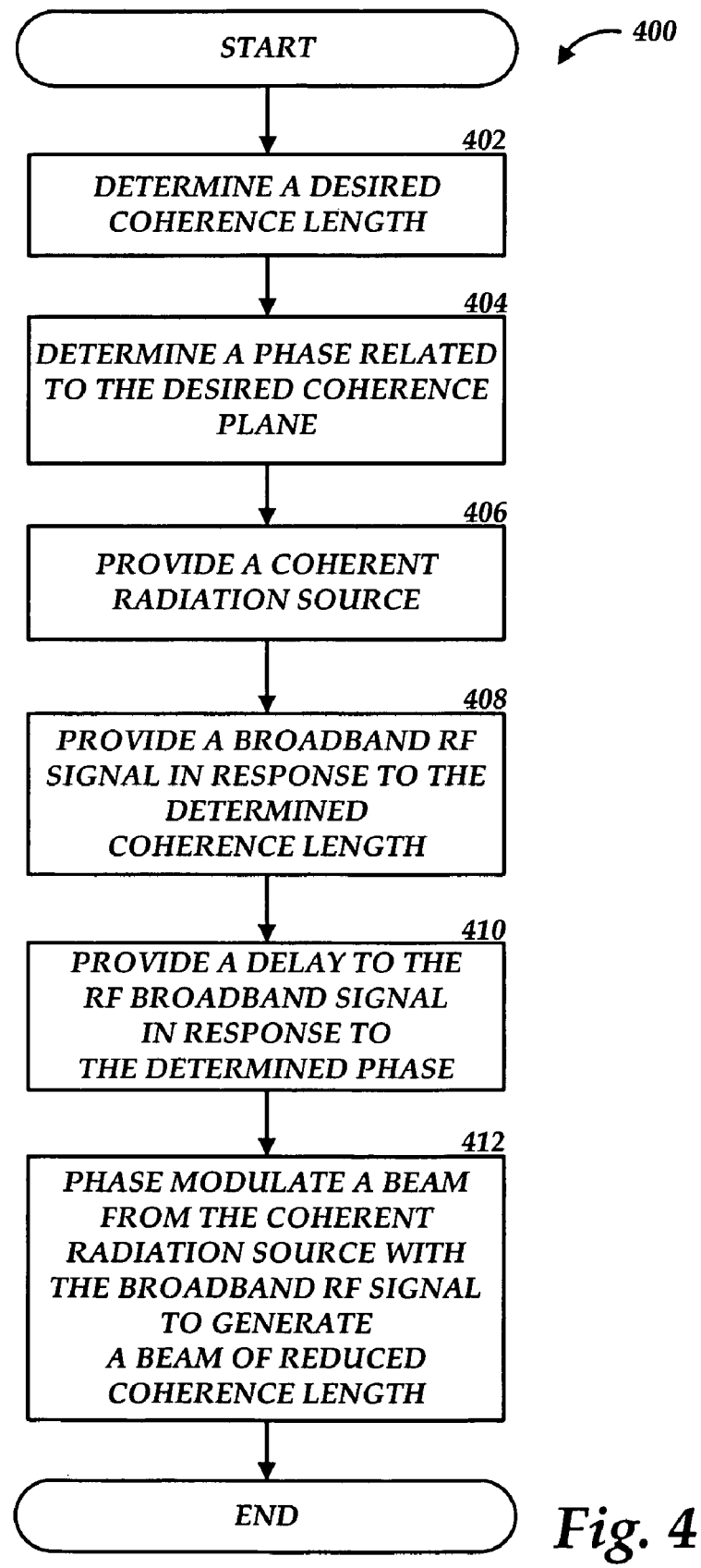
FIG. 4 is a logical flow diagram illustrating a process for reducing the coherence length of a coherent radiation beam according to embodiments described herein.

Turning now to FIG. 4, additional details will be provided regarding the embodiments presented herein for controlling coherence length. In particular, FIG. 4 is a flow diagram showing a routine 400 performed by a coherence controller assembly 100 for reducing the coherence length of a coherent radiation beam. It should be appreciated that the operations described herein may be performed in parallel, or in a different order than in the illustrative examples described herein. It should also be appreciated that more or fewer operations may be performed than shown in the figures and described herein. Although several examples used in describing the method relate to interferometry, applications to other systems requiring, or benefiting from, coherence control may apply.

The routine 400 can begin with operation 402 where a desired coherence length is determined. In an exemplary interferometer system 200, such as illustrated in FIG. 2, the coherence length may be selected to be smaller than the distance between the sample 245 and the elements nearest to the sample within the interferometer 200. These neighboring elements may be a beam splitter 240 and a mirror 250. In other exemplary configurations, the neighboring elements may be other components. Reducing the coherence length to be within this distance may be useful for placing beam interactions from other elements, such as the nearest neighboring elements of an interferometer 200, outside of the coherence length. Placing other beam interaction outside of the coherence length may remove unwanted fringe patterns from the output plane 220. The desired coherence length may also be selected based on various system parameters or required aspects of the output reduced coherence length beam 120.

Next, at operation 404, a phase related to the desired coherence plane can be determined. The phase can be the required beam delay or advancement to be applied to the reference beam to modify the path length of the reference beam and effectively position the coherence plane within a system. For example, such a system may be an interferometer system 200. This phase that may be introduced to the system using a variable delay device 277. This phase may be incorporated into the path length of the measurement beam, the reference beam, or in part to both beams.

In operation 406, a coherent radiation source is provided to generate the electromagnetic beam. The source may be a long-coherence length source 102 to generate the long coherence length beam 103. Some examples of coherent radiation sources include but are not limited to RF, microwave, optical, x-ray, and infrared. If the source is an optical source, any type of laser or any other optical source may be used. Some examples are a frequency stabilized HeNe laser, any other gas laser, a semiconductor laser, a crystal laser, a vertical-cavity surface-emitting laser (VCSEL), and a Fabry-Perot laser.

In operation 408, a broadband RF signal 113 may be provided in response to the desired coherence length determined in operation 402. As previously discussed, the broadband RF signal 113 can be generated by mixing the RF carrier signal 265 with the RF noise signal 275. The RF noise signal 275 is generated by the random noise source 270 with a frequency spectrum extending from zero frequency (DC) to a controllable upper frequency. In operation 410, a delay may be provided to the broadband RF signal in response to the delay, or phase, determined in operation 404. The phase, or delay, may be introduced to the system using the variable delay device 277. This phase may be incorporated into the path length of the measurement beam, the reference beam, or in part to both beams.

In operation 412, a beam 103 from the coherent radiation source 102 may be phase modulated using the broadband RF signal 113 to generate a beam of reduced coherence length 120. The optical frequency of a beam 103 from a laser can be made broader as a controllable upper frequency of the random noise source 270 is increased. Broadening the optical frequency, or bandwidth, of the beam 103 from the laser 102 can decrease the coherence length of the beam. The phase modulator may be an electro-optical modulator or an AOM. More generally, the phase modulator may be any mechanism of electromagnetic modulation or mixing via mechanical, electrical, optical, magnetic, or any other exemplary techniques. Routine 400 ends after operation 412.

Based on the foregoing, it should be appreciated that technologies for coherence length control are presented herein. Although the subject matter presented herein has been described in language specific to optical assemblies, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for controlling a coherence length of a coherent radiation beam within an interferometer system, comprising:
   providing a coherent radiation source to generate the coherent radiation beam;
   splitting a reference beam from the coherent radiation beam;
   splitting a measurement beam from the coherent radiation beam;
   applying the measurement beam to a sample;
   generating an output pattern in response to an interference between the reference beam and the measurement beam;
   applying a phase modulator to one of the reference beam and the measurement beam;
   providing a broadband radio frequency (RF) signal to the phase modulator in response to a pseudorandom noise signal; and
   controlling the broadband RF signal to improve a contrast of the output pattern.

2. The method of claim 1, further comprising providing a controllable variable delay to the broadband RF signal for positioning the interference along a path associated with the reference beam and the measurement beam.

3. The method of claim 2, further comprising adjusting the controllable variable delay to select a region of measurement within the interferometer system.

4. The method of claim 1, further comprising controlling a bandwidth of the broadband RF signal in response to a spacing between the components of the interferometer system.

5. The method of claim 1, wherein the coherent radiation source is selected from a group consisting of laser, gas laser, semiconductor laser, maser, and coherent radio wave emitter.

6. The method of claim 1, wherein the phase modulator is selected from a group consisting of electro-optic modulator, acousto-optic modulator, magneto-optic modulator, and Bragg cell modulator.

7. A method for controlling a coherence length of a coherent radiation beam within an interferometer system, comprising:
   providing a coherent radiation source to generate the coherent radiation beam;
   splitting a reference beam from the coherent radiation beam;
   splitting a measurement beam from the coherent radiation beam;
   applying the measurement beam to a sample;
   generating an output pattern in response to an interference between the reference beam and the measurement beam;
   applying a phase modulator to one of the reference beam and the measurement beam;
   providing a broadband RF signal to the phase modulator, comprising
      providing a pseudorandom noise signal,
      providing an RF carrier signal, and
      mixing the pseudorandom noise signal with the RF carrier signal to generate the broadband RF signal; and
   controlling the broadband RF signal to improve a contrast of the output pattern.

8. The method of claim 7, further comprising providing a controllable variable delay to the broadband RF signal for positioning the interference along a path associated with the reference beam and the measurement beam.

9. The method of claim 8, further comprising adjusting the controllable variable delay to select a region of measurement within the interferometer system.

10. The method of claim 7, further comprising controlling a bandwidth of the broadband RF signal in response to a spacing between the components of the interferometer system.

11. The method of claim 7, wherein the coherent radiation source is selected from a group consisting of laser, gas laser, semiconductor laser, maser, and coherent radio wave emitter.

12. The method of claim 7, wherein the phase modulator is selected from a group consisting of electro-optic modulator, acousto-optic modulator, magneto-optic modulator, and Bragg cell modulator.

13. A method for controlling a coherence length of a coherent radiation beam within an interferometer system, comprising the steps of:
   providing a coherent radiation source to generate the coherent radiation beam;
   splitting a reference beam from the coherent radiation beam;
   splitting a measurement beam from the coherent radiation beam;
   applying the measurement beam to a sample;
   generating an output pattern in response to an interference between the reference beam and the measurement beam;
   applying a phase modulator to one of the reference beam and the measurement beam;
   providing a broadband RF signal to the phase modulator; and
   controlling the broadband RF signal to improve a contrast of the output pattern by controlling a bandwidth of a pseudorandom noise signal.

14. The method of claim 13, further comprising providing a controllable variable delay to the broadband RF signal for positioning the interference along a path associated with the reference beam and the measurement beam.

15. The method of claim 14, further comprising adjusting the controllable variable delay to select a region of measurement within the interferometer system.

16. The method of claim 13, further comprising controlling a bandwidth of the broadband RF signal in response to a spacing between the components of the interferometer system.

17. The method of claim 13, wherein the coherent radiation source is selected from a group consisting of laser, gas laser, semiconductor laser, maser, and coherent radio wave emitter.

18. The method of claim 13, wherein the phase modulator is selected from a group consisting of electro-optic modulator, acousto-optic modulator, magneto-optic modulator, and Bragg cell modulator.

* * * * *